3,522,983
Patented Aug. 4, 1970

3,522,983
MAGNIFYING SPECTACLES
Erwin Daniels, Konigsbronn, Wurttemberg, Germany, assignor to Carl Zeiss Stiftung, doing business as Carl Zeiss, Wurttemberg, Germany, a corporation of Germany
Filed July 5, 1968, Ser. No. 742,656
Claims priority, application Germany, July 6, 1967, Z 12,937
Int. Cl. G02b 7/16, 25/00; G02c 7/08
U.S. Cl. 350—146    7 Claims

ABSTRACT OF THE DISCLOSURE

Adjustable magnifying spectacles in which magnifying lens systems are adjustably mounted independently of each other within predetermined angular limits in holding rings which latter are fixedly attached to the front faces of the corrective spectacle lenses.

The invention relates to magnifying spectacles of the type in which a magnifying lens system is arranged in front of each eye of the user, which preferably is designed in the manner of a Galilean telescope.

Presently, there exist various designs of magnifying spectacles of the type indicated. The magnifying lens systems may either be mounted separately in a kind of a frame for spectacles, or, being more advantageous, the magnifying lens systems may be combined with the corrective lenses of a pair of spectacles. In the latter case, for instance, such magnifying lens systems are attached to a support in a position of convergence corresponding to the working distance, the support itself being attached to the bridge of the frame of the spectacles having mounted therein corrective lenses. This design is disadvantageous in so far as the support impairs the user's environmental field viewing.

The magnifying spectacles disclosed in the German Utility Model No. 1,787,396, prevent the user from being disturbed in such a manner. Herein, the magnifying lens systems are directly joined to the corrective lenses of the spectacles. This is accomplished by cementing one holding ring each to the corrective lenses of the spectacles, into which the magnifying lens systems are inserted.

Now, in magnifying spectacles, the magnifying lens systems must be adjusted relatively to the pair of eyes and to each other in a manner such that the axes of the systems coincide with the lines of vision of the pair of eyes to an object point disposed in the focal plane of the magnifying lens system.

In magnifying spectacles, in which the magnifying lens systems are directly joined to the spectacle corrective lenses, such adjustment offers some difficulties. These difficulties are, on the one hand, due to the fact that the spacing of the magnifying lens systems, when cemented and when truing the spectacle lenses must be adapted to the respective spacing of the centers of rotation of the eyeballs. On the other hand, the axes of the systems must be adjusted quite accurately in order to coincide with the lines of vision of the pair of eyes to an object point disposed in the focal plane of the magnifying spectacles. This accurate adjustment of the axes of the systems gives rise to particular difficulties, as in the case of a rigid joint between the magnifying lens systems and the spectacle corrective lenses, both corrections in the position of convergence and also errors of the vertical angle between the left and the right system may be compensated only by deforming the bridge of the frame of the spectacles. Generally, this cannot be done by the user himself, but only by the ophthalmic optician, whereby the accurate adjustment of the magnifying lens systems is rendered even more difficult, as the ophthalmic optician is not able to effect the adjustment from his own view, but only according to the statements made by the user.

A satisfactory adjustment of the magnifying lens systems also requires that the sides be at such an angle to the plane of the spectacle frame that the rearwardly extended axes of the systems (considering the deflecting effect of the spectacle lenses) do not run above or below the centers of rotation of the eyeball. This adjustment, however, does not offer particular difficulties, in general.

It is the object of the present invention to provide magnifying spectacles with a device enabling the user to effect the accurate adjustment of the magnifying lens systems in simple manner without any professional assistance. The invention is intended to be principally applicable to all conventional types of attachment of magnifying lens systems to spectacles to be attached to the head of the user, it being presumed that holding rings for the magnifying lens systems are rigidly joined to spectacle corrective lenses.

Thus, the present invention relates to magnifying spectacles, wherein holding ring for the magnifying lens systems are rigidly secured to the corrective spectacle lenses. It is characterized in that each magnifying lens system is supported in its associated holding ring in a manner such that the direction of the optical axis of the system is adjustable within predetermined angular ranges.

Herein, it is presumed that the spacing of the holding rings is correct for the respective user. Under this prerequisite, the user himself may then adjust the magnifying lens systems in the holding rings until the accurate adjustment is obtained. The adjusted position may then be fixed, for instance, by set screws.

Therefore, the visual inadequacy of the user is corrected both when looking through the magnifying lens systems as also in environmental field viewing without magnifying means.

A possible embodiment of the inventive conception provides the support of the magnifying lens systems in the holding rings by means of a ball joint. This construction provides all the necessary degrees of freedom and permits the user to effect the adjustment all by himself. Generally, however, this construction is relative expensive, and also fixing the adjusted position offers some difficulties.

In a preferred embodiment of the inventive conception, one degree of freedom is dispensed with, and each magnifying lens system is pivoted in its associated holding ring in a manner such that the optical axis of the system forms a small angle with the axis of rotation. Thus, with this construction, it is only necessary to design the holding rings in a manner such as to permit rotation of the inserted magnifying lens system about the axis of the holding ring. Upon rotation of each magnifying lens system in the holding ring, the optical axis then describes a curved cone surface, the trace of which is a circle in the object plane.

When manufacturing magnifying spectacles according to the present invention as hereinbefore described, it is only necessary to roughly condition the magnifying lens systems together with the spectacle lenses, and that is in a manner such that the two previously mentioned circles partly overlap each other in the object plane. The fine adjustment will be effected by the user himself by rotation of the magnifying lens systems, when looking through them, until one of the points of intersection of the two circles in the object plane has been found. In this position, the magnifying lens systems will then be fixed. Generally, there are two points of intersection of the aforementioned circles, and hence, two solutions. Now, the one solution may be selected which requires the least change in the bridge adjustment of the spectacles.

The angle between the optical axis of the lens systems and the axis of rotation may be effected both in mechanical and also in optical manner. With the mechanical solution, each magnifying lens system is supported in its associated holding ring in a manner such that the axis of the system being at the same time the optical axis, subtends a small angle with the axis of the holding ring. With the optical solution, at least one of the magnifying lenses of each magnifying lens system is designed to be prismatic, in such case each magnifying lens system being supported in its associated holding ring in a manner such that the mechanical axis of the system coincides with the axis of the holding ring.

It has been shown to be suitable that the angle, not being critical per se, between the optical axis of the magnifying lens system and the axis of rotation be selected up to 5°, preferably in a range of between 2° and 5°. Therein, the vertex of the angle should be as close as possible to the holding ring for the magnifying lens system.

If the necessary angle is to be effected optically, a prismatic effect amounting up to five prism diopters, will be advantageously afforded to one objective lens of each magnifying lens system.

The magnifying spectacles according to the invention offer the further advantage that with one and the same pair of magnifying lens systems in one frame, several different magnifications and working distances connected therewith can be made available alternatingly. In magnifying spectacles, a change in the magnification is obtained by slip-on lenses of suitable focal length, known per se. Thus, by slip-on lenses of positive effect, a greater magnification is obtained which, however, is connected with a smaller working distance. For binocular viewing, this smaller working distance requires a stronger convergence of the lines of vision which cannot be obtained without particular measures with magnifying lens systems attached in the spectacle frame at a fixed angle of convergence.

According to a further embodiment of the magnifying spectacles of the invention at least one of the magnifying lens systems is provided with a mount in which a slip-on lens can be mounted rotatably, and at least one of the slip-on lenses is designed to be prismatic in a manner such that the additional amount of convergence due to the changed magnification and working distance is afforded by the prismatic effect. Therein, the magnifying lens systems themselves are designed according to the embodiment already mentioned hereinbefore, in a manner such that the axis of the system being at the same time the optical axis subtends a small angle with the axis of the holding ring. With this embodiment, the magnifying lens systems are adjusted at first without slip-on lenses for the normal working distance by rotation thereof about their longitudinal axis. If the user intends to change over to a greater magnification, the slip-on lenses will be attached to the magnifying lens systems, and the slip-on lenses will be adjusted by themselves to the correct point of intersection of the lines of vision by rotation thereof.

The invention will be hereinafter described in greater detail with reference to the FIGS. 1 to 4 illustrating a few embodiments, wherein FIG. 1 illustrates in a perspective view a pair of magnifying spectacles wherein the magnifying lens systems are rigidly attached to the corrective lenses of the pair of spectacles;

Figure 1:
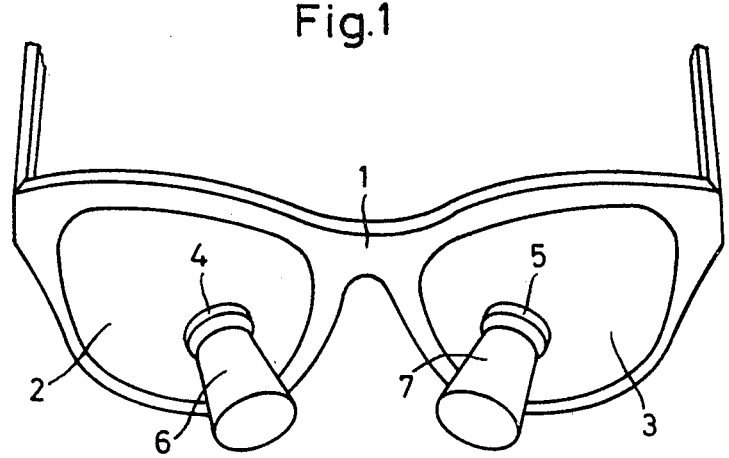

Referring to FIG. 1, the frame 1 of the spectacles is provided with the corrective lenses 2 and 3. The surfaces of these lenses facing away from the eyes have sleeve-like holding rings 4 and 5 cemented thereto, intended for the reception of magnifying lens systems disposed in frusto-conical mounts 6 and 7.

Figure 2:
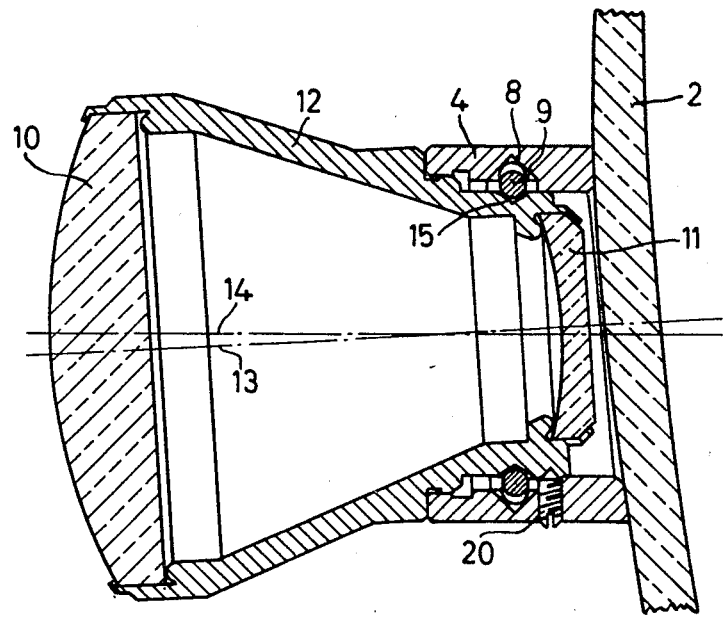
FIG. 2 is a section through a magnifying lens system which is inserted in a holding ring in mechanically tilted manner.

FIG. 2 shows a section through the magnifying lens system joined to the corrective lens 2. The holding ring 4 cemented to the corrective lens 2 is provided with an interior annular groove 8 in which an annular spring 9 is arranged. The magnifying lens system consisting of the axially spaced lenses 10 and 11 is arranged in the mount 12. This mount is formed with an exterior annular groove 15 in which the annular spring 9 engages after insertion of the magnifying lens system in the sleeve-like holding ring 4.

The mount 12 is so constructed that the magnifying lens system is supported in the holding ring 4 in a tilted manner, whereby a small angle having a size of 3° with the illustrated embodiment, is produced between the axis of the system 13 being at the same time the optical axis, and the axis 14 of the holding ring 4.

For adjustment, the mount 12 of the system is rotated in the holding cylinder 4, the optical axis 13 describing a conical sleeve surface about the axis of rotation 14. After the accurate adjusted position has been obtained, the mount 12 is fixed in position by means of the set screw 20.

Figure 3:
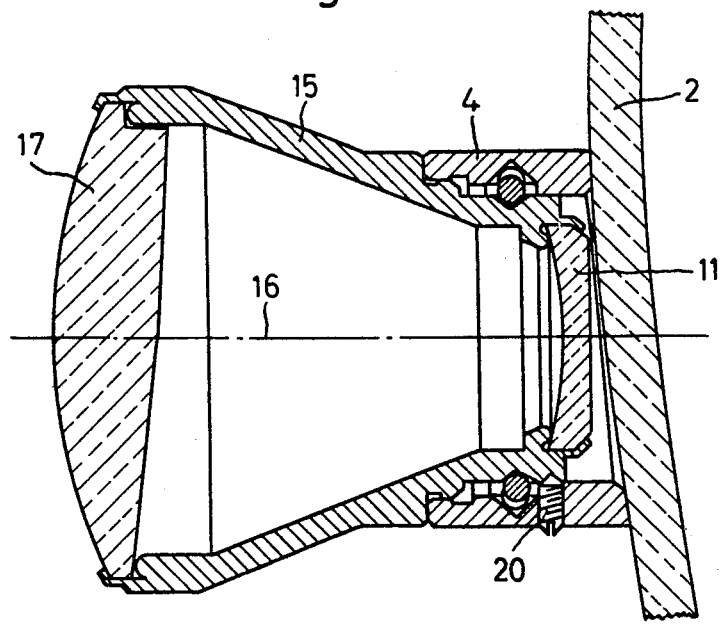
FIG. 3 is a section through a magnifying lens system which is provided with a prismatic objective lens.

In the embodiment illustrated in FIG. 3, the mount 15 of the magnifying lens system is designed so that the central axis 16 of the mount 15 coincides with the axis of the holding ring 4. However, the objective lens 17 is designed to be prismatic, so that also in this embodiment, the optical axis forms a small angle with the axis of rotation.

Figure 4:
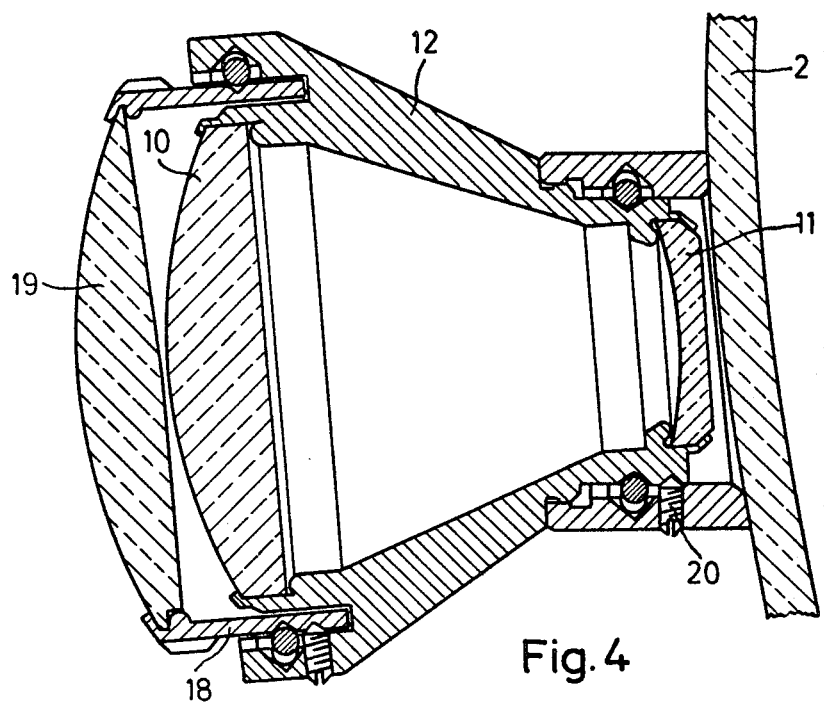
FIG. 4 is a section through a magnifying lens system, wherein the change to another magnification is attainable by attachment of a prismatically designed slip-on lens.

In the embodiment illustrated in FIG. 4, the magnifying len system and its support are constructed similarly to those in FIG. 2. The mount 12 has connected thereto, however, another mount 18 which carries an additional prismatic lens 19. The additional mount 18 is axially slidably inserted in the enlarged outer end of the mount 12. The lens 19 and its mount 18 are supported on the mount 12 in such a manner that the mount 18 with its lens 19 therein may be rotated independently of the mount 12 of the system.

In this embodiment, the accurate adjustment of the magnifying spectacles to a specific normal working distance is effected by a rotation of the magnifying lens system without slip-on lenses. When changing to another magnification and working distance connected therewith, the slip-on lenses 19 are attached and the adjustment for the new working distance is effected by a rotation of the prismatic slip-on lenses 19.

While in the disclosed preferred embodiment of the invention the holding rings 4 and 5 are attached and cemented directly to the front faces of the corrective lenses, it would also be possible to attach the holding rings by means of a suitable support bracket directly to the frame of the spectacles.

What I claim is:

1. Magnifying spectacles comprising in combination, a pair of spectacles provided with a pair of corrective lenses, a pair of holding rings fixedly mounted relatively to said corrective lenses and in front thereof, a pair of magnifying lens systems, each comprising a mount having axially spaced lenses arranged therein, means for supporting said mounts with their lenses therein independently of each other rotatably adjustable with one of their ends in their respective holding rings about their optical axes which form a small angle with the center axes of their associated holding rings in such a manner that the optical axes of said lens systems intersect the center axes of said holding rings at a point within said mounts and closer to the lenses which are nearer said corrective lenses than to the other lenses in said mounts, and means attached to said holding rings for locking said mounts in the selected adjusted positions.

2. Magnifying spectacles according to claim 1, in which said holding rings are fixedly attached to the front faces of said corrective lenses.

3. Magnifying spectacles according to claim 1, in which the optical axes of said magnifying lens systems form an angle of up to 5° with the center axes of said holding rings.

4. Magnifying spectacles according to claim 1, including a magnifying lens in said magnifying lens systems which is prismatic.

5. Magnifying spectacles according to claim 1, including a magnifying lens in said magnifying lens systems having a prismatic effect of up to five prism diopters 6. Magnifying spectacles according to claim 1, including a slip-on lens for each said magnifying lens systems for changing the degree of magnification.

7. Magnifying spectacles according to claim 1, including a slip-on lens for each said magnifying lens systems for changing the degree of magnification, said slip-on lenses being prismatic, and means for rotating said slip-on lenses relatively to said magnifying lens systems to which they are attached.

References Cited

UNITED STATES PATENTS

| | | | |
|---|---|---|---|
| 2,389,428 | 11/1945 | Glasser. | |
| 2,935,910 | 5/1960 | Schmidt | 350—146 |
| 3,064,528 | 11/1962 | Gelatt | 350—146 X |
| 3,273,456 | 9/1966 | Feinbloom | 350—146 |

DAVID SCHONBERG, Primary Examiner

P. A. SACHER, Assistant Examiner

U.S. Cl. X.R.

350—145, 255, 257; 351—58